(12) United States Patent
Brakob

(10) Patent No.: US 11,783,355 B1
(45) Date of Patent: *Oct. 10, 2023

(54) MEMORY MANAGEMENT FOR MOBILE DEVICE CORRELATION

(71) Applicant: Target Brands, Inc., Minneapolis, MN (US)

(72) Inventor: Christopher Mark Brakob, Maple Grove, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,979

(22) Filed: Apr. 20, 2022

Related U.S. Application Data

(60) Division of application No. 17/127,164, filed on Dec. 18, 2020, now Pat. No. 11,348,128, which is a division of application No. 16/854,411, filed on Apr. 21, 2020, now Pat. No. 10,909,556, which is a continuation of application No. 16/284,142, filed on Feb. 25, 2019, now Pat. No. 10,733,620.

(51) Int. Cl.
*G06Q 30/0201* (2023.01)
*G06K 7/10* (2006.01)
*G06Q 10/087* (2023.01)

(52) U.S. Cl.
CPC ..... *G06Q 30/0201* (2013.01); *G06K 7/10435* (2013.01); *G06Q 10/087* (2013.01)

(58) Field of Classification Search
None
See application file for complete search history.

(56) References Cited

U.S. PATENT DOCUMENTS

| | | |
|---|---|---|
| 8,554,247 B2 | 10/2013 | Heikkilae et al. |
| 8,947,235 B2 | 2/2015 | Joseph |
| 9,129,273 B2 | 9/2015 | Baldwin et al. |
| | (Continued) | |

FOREIGN PATENT DOCUMENTS

| | | |
|---|---|---|
| CN | 103068039 A | 4/2013 |
| WO | 2008118989 A1 | 10/2008 |

OTHER PUBLICATIONS

Musa et al., Tracking Unmodified Smartphones Using Wi-Fi Monitors, University of Illinois at Chicago, https://www.cs.uic.edu/pub/Bits/Musa/musa-eriksson-sensys12.pdf, Dec. 31, 2012.

(Continued)

*Primary Examiner* — Kristy A Haupt
(74) *Attorney, Agent, or Firm* — Theodore M. Magee; Westman, Champlin & Koehler, P.A.

(57) ABSTRACT

For a measurement period, signal strengths, device identifiers and access point identifiers are received from a plurality of access points. A record for the measurement period is stored in random access memory with the record being associated with a single device identifier and containing access point identifiers associated with signal strengths received for the measurement period. The location of a device is determined for the measurement period by retrieving spatial coordinates of a corresponding access point for each access point identifier in the record for the measurement period and setting the location of the device for the measurement period to the average of the retrieved spatial coordinates.

20 Claims, 14 Drawing Sheets

(56) References Cited

U.S. PATENT DOCUMENTS

| | | |
|---|---|---|
| 9,367,865 B2 | 6/2016 | Treiser et al. |
| 9,460,442 B2 | 10/2016 | Fonzi et al. |
| 9,664,510 B2 | 5/2017 | Nathan et al. |
| 10,332,117 B2 | 6/2019 | Krause et al. |
| 10,733,620 B1* | 8/2020 | Brakob ............... G01S 13/726 |
| 10,909,556 B1 | 2/2021 | Brakob |
| 2013/0331124 A1* | 12/2013 | Rieger, III .......... G01S 5/02521 |
| | | 455/456.1 |
| 2014/0006206 A1 | 1/2014 | Scrivner |
| 2014/0249887 A1 | 9/2014 | Parkkinen et al. |
| 2015/0201300 A1 | 7/2015 | Boulay et al. |
| 2015/0235161 A1 | 8/2015 | Azar et al. |
| 2016/0021512 A1 | 1/2016 | Krallman et al. |
| 2016/0132822 A1 | 5/2016 | Swafford |
| 2016/0239796 A1 | 8/2016 | Grant et al. |
| 2016/0316317 A1 | 10/2016 | Mayiras |
| 2017/0365143 A1 | 12/2017 | King et al. |
| 2018/0144295 A1 | 5/2018 | Engel et al. |
| 2020/0242658 A1 | 7/2020 | Tumanyan et al. |

OTHER PUBLICATIONS

Prosecution history of corresponding U.S. Appl. No. 16/284,142 including: Notice of Allowance dated May 28, 2020, Amendment dated May 6, 2020 and Office Action dated Feb. 14, 2020, 30 pages.

Prosecution history of corresponding U.S. Appl. No. 16/854,411 including: Notice of Allowance dated Oct. 27, 2020, Amendment dated Oct. 14, 2020 and Office Action dated Aug. 18, 2020, 35 pages.

Prosecution history of corresponding U.S. Appl. No. 17/127,164 including: Notice of Allowance dated Feb. 2, 2022, Amendment dated Nov. 30, 2021 and Office Action dated Sep. 1, 2021, 36 pages.

* cited by examiner

MEMORY MANAGEMENT FOR MOBILE DEVICE CORRELATION

CROSS-REFERENCE TO RELATED APPLICATION

The present application is a divisional of and claims priority of U.S. patent application Ser. No. 17/127,164, filed Dec. 18, 2020, which is a divisional of and claims priority to U.S. patent application Ser. No. 16/854,411, filed Apr. 21, 2020, now Pat. No. 10,909,556 B1, issued Feb. 2, 2021 which is a continuation of 16/284,142, filed Feb. 25, 2019, now Pat. No. 10,733,620, issued Aug. 4, 2020, the content of which is hereby incorporated by reference in its entirety.

BACKGROUND

Radio Frequency IDentification (RFID) tags generate radio signals containing unique identifiers. When a unique identifier is associated with an object and the tag is applied to the object, the signal from the tag can be used to determine that the object is near a RFID detector. In some systems, multiple RFID detectors are used together to identify a position for the object based on the strength of the radio signals received at each detector.

The discussion above is merely provided for general background information and is not intended to be used as an aid in determining the scope of the claimed subject matter. The claimed subject matter is not limited to implementations that solve any or all disadvantages noted in the background.

SUMMARY

For a measurement period, signal strengths, device identifiers and access point identifiers are received from a plurality of access points. A record for the measurement period is stored in random access memory with the record being associated with a single device identifier and containing access point identifiers associated with signal strengths received for the measurement period. The location of a device is determined for the measurement period by retrieving spatial coordinates of a corresponding access point for each access point identifier in the record for the measurement period and setting the location of the device for the measurement period to the average of the retrieved spatial coordinates.

In accordance with a further embodiment, a computer includes random access memory and a processor. The processor executes instructions retrieved from the random-access memory to receive signal strengths, device identifiers and access point identifiers from a plurality of access points and to store the received access point identifiers in the random-access memory. The processor sets a location for a device to an average of locations of access points corresponding to the access point identifiers.

In accordance with a further embodiment, a method includes receiving signal strengths for signals generated by a device, wherein each signal strength is from a separate access point. Access points that provided signal strengths above a threshold are identified and a location for the device is set to an average of the locations of the identified access points.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In a retail store, thousands of mobile devices enter and move through the store as customers shop. Efforts have been made in the past to track the movement of customers by using radio signals generated by the mobile devices to determine positions of the mobile devices. Specifically, wireless network access points have been used to detect wireless network signals that are generated by mobile devices. These wireless signals include a device identifier, such as the Media Access Control (MAC) address, that allows signals from different devices to be distinguished from each other. Each access point records the MAC address and signal strength of each signal it detects. At periodic measuring/detecting periods, the signal strengths at different access points for a same signal from a same MAC address are used to perform trilateration to identify a position of the device. Such trilateration is based on the assumption that signal strength and distance to an associated access point are strongly correlated.

A significant challenge with such systems is the huge amount of data that is generated. In order to be useful, the access points must provide signal strength values at least once every second. This can result in a gigabyte of data being generated every hour. That much data can easily overwhelm the amount of available random access memory in a computing device and require that the data be stored on a storage device. However, once the data has been stored on a storage media, the performance of the computer drops when trying to use the data to track the mobile devices because the computer must make read requests to retrieve the data from the storage media before being able to use it.

The embodiments described below provide techniques for reducing the computational load associated with identifying which of the large number of mobile devices in a store moved together with an RFID tag on a product. The techniques include reducing the number of signal strength values used to determine the location of a mobile device and freeing random access memory used to store the signal strengths quickly so that the amount of needed random access memory does not exceed the available random access memory of the computer. In addition, embodiments provide ways to limit how many mobile devices are tracked. In particular, the removal of an item carrying an RFID tag without a corresponding point of sale transaction is used to trigger a search for candidate mobile devices that could have been moving with the RFID tag when it left the store. Only the paths of the candidate mobile devices are then compared to the path of the RFID tag to determine which candidate mobile devices were correlated to the RFID tag.

Figure 1:
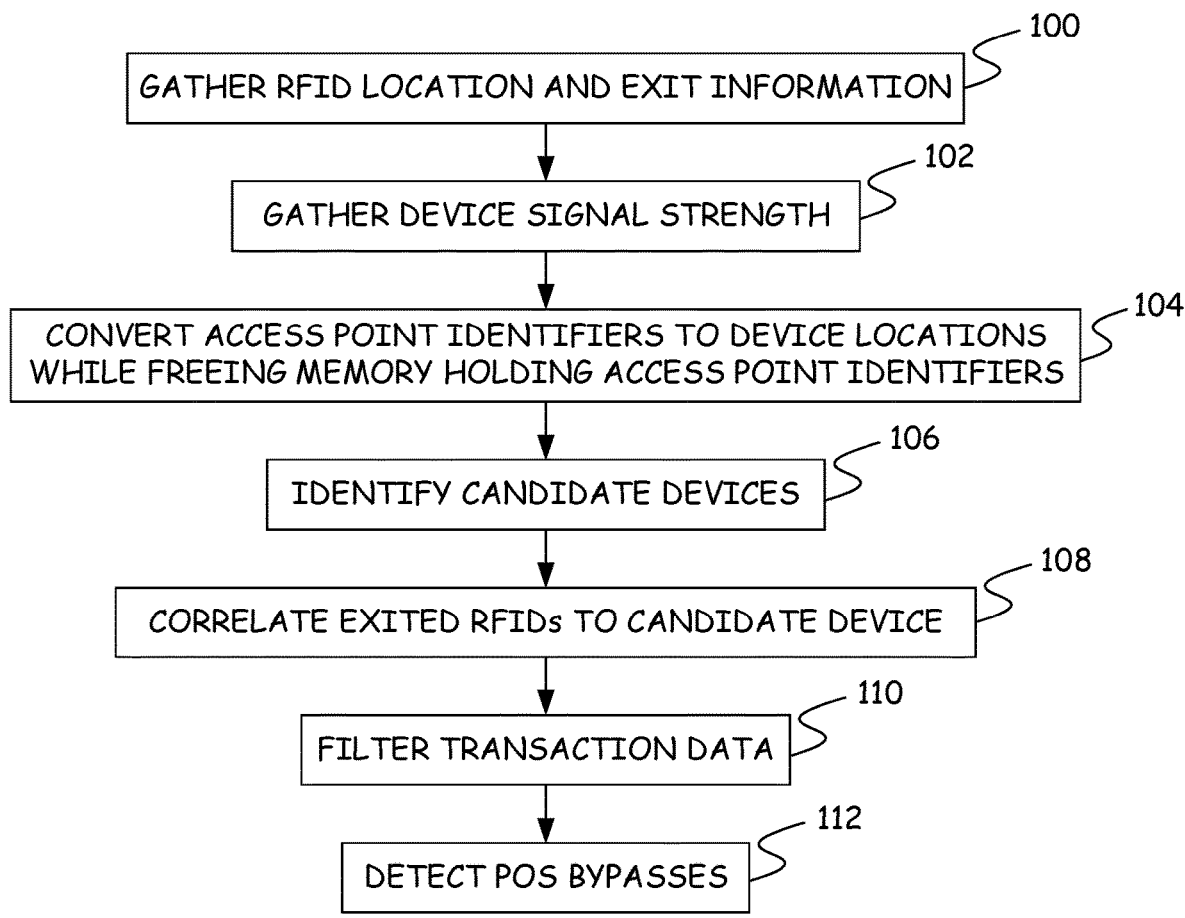
FIG. 1 is a flow diagram for identifying mobile devices that were associated with a POS bypass event in accordance with one embodiment.
Figure 2:
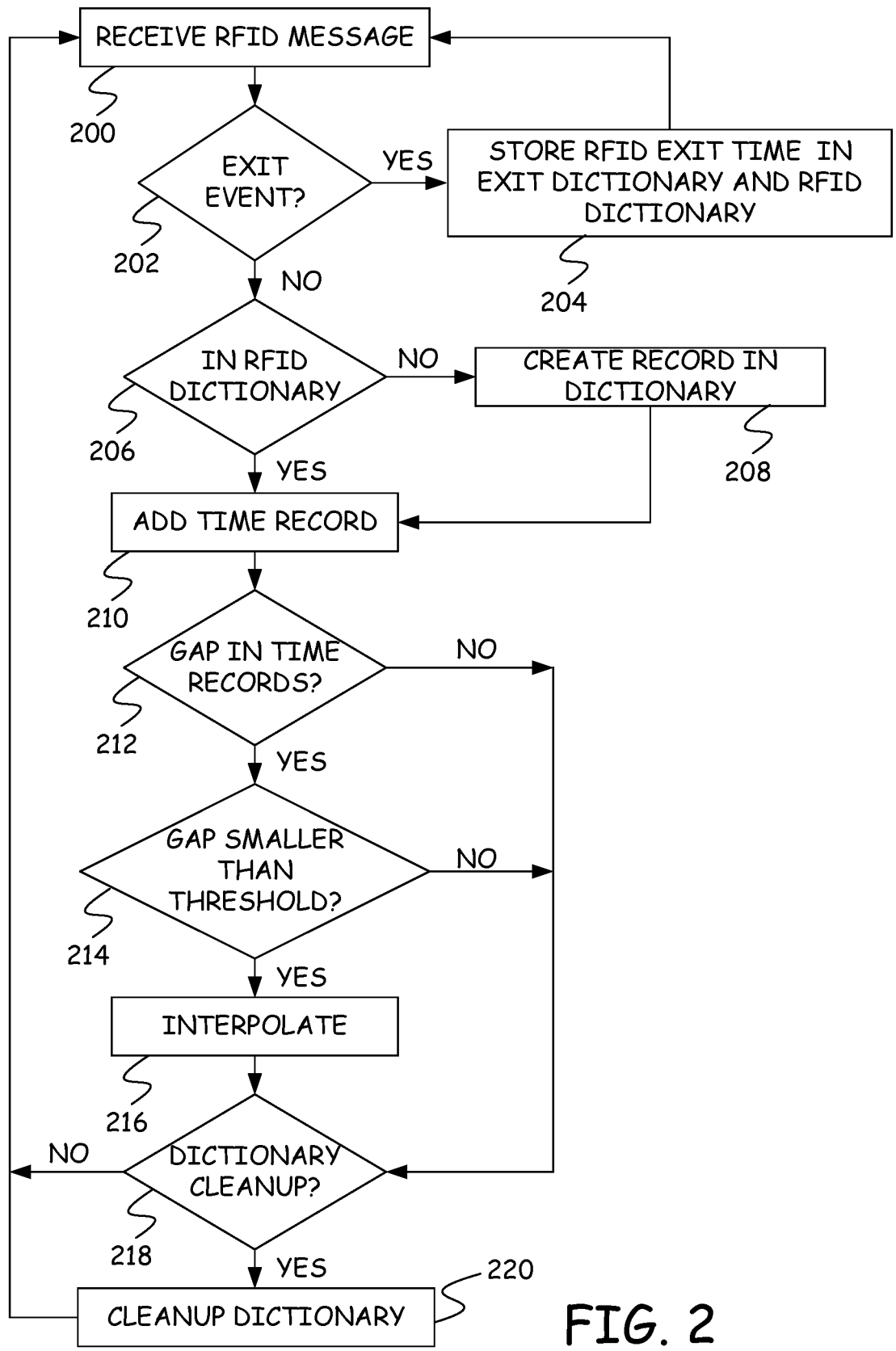
FIG. 2 is a flow diagram of a method of gathering RFID location and exit information.

FIG. 1 provides a flow diagram of a method of identifying devices that are associated with a product bypassing POS registers when exiting a store. At step 100 of FIG. 1, RFID location and exit information is gathered for RFID tags in a store. FIG. 2 provides a flow diagram of a method for performing step 100 and FIG. 3 provides a block diagram of elements used in the method of FIG. 2.

Figure 3:
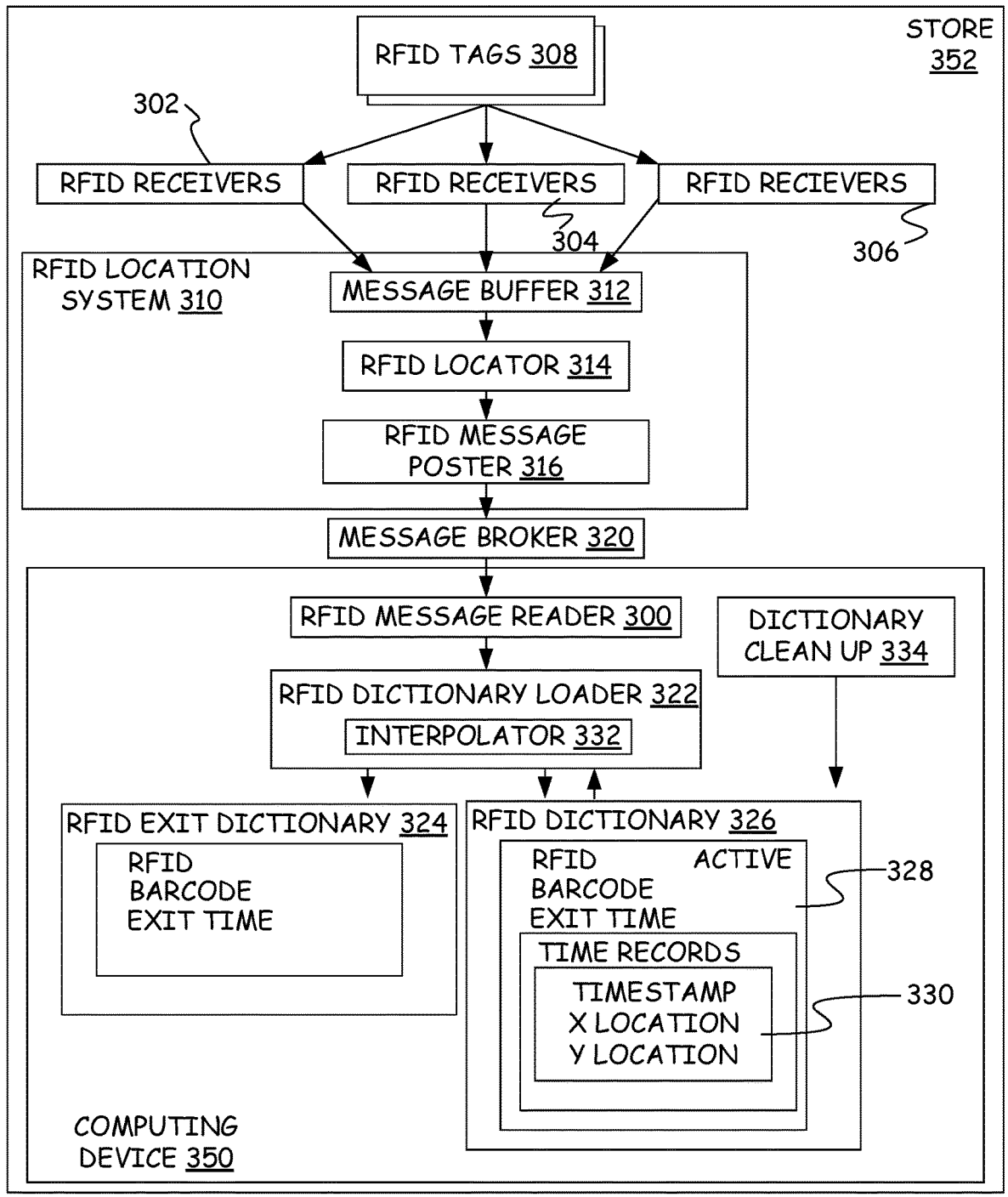
FIG. 3 is a block diagram of elements used in the method of FIG. 2.

As shown in FIG. 3, each of a collection of RFID tags 308, which are coupled to a respective product unit in a store 352, generate a radio signal that carries the value of the RFID and the value of a barcode associated with the RFID tag. Each radio signal is detected by one or more RFID receivers such as RFID receivers 302, 304 and 306. In response to the detected signals, the RFID receivers 302, 304 and 306 generate messages that include the RFIDs, the barcode values, and in some cases one or more descriptors of the signal. One or more of the RFID receivers may be positioned at an exit and may convey that the RFID tag passed through the exit. The messages generated by the RFID receivers 302, 304 and 306 are provided to an RFID location system 310. In accordance with one embodiment, the messages are provided to a message buffer 312 in location system 310 and then are accessed by a RFID locator 314, which determines a location of the RFID tags based on the information provided by the RFID receivers. RFID locator 314 then instructs a message poster 316 to post a message for each detected RFID indicating the location of the RFID tag and sometimes additional data such as whether the RFID tag has exited the retail store. RFID message poster 316 incorporates the RFID value, and the barcode associated with the RFID tag into the message. RFID message poster 316 then posts the message to a message broker 320, which may be located on the same server as the RFID location system 310 or may be located on a different server.

At step 200 of FIG. 2, a RFID message reader 300 requests and receives one of the posted messages from message broker 320. RFID message reader 300 parses the received message and provides the parsed information to an RFID dictionary loader 322. At step 202, RFID dictionary loader 322 determines if the received message is an exit event. If the received message is an exit event, RFID dictionary loader 322 stores the RFID, its associated barcode, and the time that the RFID exited in an RFID exit dictionary 324 contained in random access memory at step 204. In addition, RFID dictionary loader 322 updates an RFID dictionary 326 stored in random access memory to include the exit time. After the exit time has been stored, the method of FIG. 2 returns to step 200 to retrieve a new RFID message.

If the received message is not an exit event at step 202, RFID dictionary loader 322 determines if the RFID is in RFID dictionary 326 at step 206. If the RFID is not in RFID dictionary 326 yet, a record 328 is created for the RFID in RFID dictionary 326 at step 208. The RFID record 328 includes the RFID and the barcode for the RFID.

If the RFID is in RFID dictionary 326 at step 206 or after a new record has been created for the RFID in dictionary 326 at step 208, a time record 330 is added to the RFID record at step 210. Each time record in RFID dictionary 326 includes a time stamp, an x-coordinate of the location of the RFID and the y-coordinate of the location of the RFID at the measurement period represented by the time stamp. At step 212, RFID dictionary loader 322 examines the time records 330 in RFID dictionary 326 for the current RFID to determine if there are any gaps between the latest entered time record and the previously entered time record for this RFID. For example, if RFID messages are collected once per second, time records 330 should contain a separate record for each second indicating the x and y location of the RFID for that second. If time records 330 indicate that no location information was stored for each second between the latest time record and the previous time record, RFID dictionary loader 322 determines that there is a gap in the time records in step 212.

At step 214, RFID dictionary loader 322 determines if the gap is smaller than a threshold. If the gap is smaller than the threshold, it is possible to interpolate the position of the RFID location for the measurement periods of the gap. As such, at step 216, an interpolator 332 in RFID dictionary loader 322 interpolates the x,y locations of the RFID for each measurement period in the gap of the time records. In accordance with one embodiment, the interpolation is performed by linearly interpolating between the latest recorded x,y locations and the previously recorded x,y locations. The interpolated x,y locations are then stored with their corresponding time stamp in time records 330.

If there is no gap in the time records at step 212, or the gap is larger than the threshold at step 214 or after interpolating at step 216, a dictionary cleanup module 334 determines if a timespan between dictionary cleanups has expired at step 218. In accordance with one embodiment, the time period between dictionary cleanups is set to two minutes. If the time period has expired at step 218, dictionary cleanup 334 performs a dictionary cleanup at step 220. In accordance with one embodiment, the dictionary cleanup includes setting an active parameter in RFID dictionary 326 to false for each RFID that has not received a new time record in the last hour. In addition, any time records 330 that are more than four hours old are deleted from RFID records 328 and any RFID record that has not received a new time record in the last four hours is deleted from RFID dictionary 326. These dictionary cleanup actions significantly reduce the amount of memory consumed by RFID dictionary 326.

In accordance with one embodiment, RFID message reader 300, RFID dictionary loader 322, RFID exit dictionary 324, RFID dictionary 326 and dictionary cleanup 334 are all hosted on a computing device 350 located within store 352.

Figure 4:
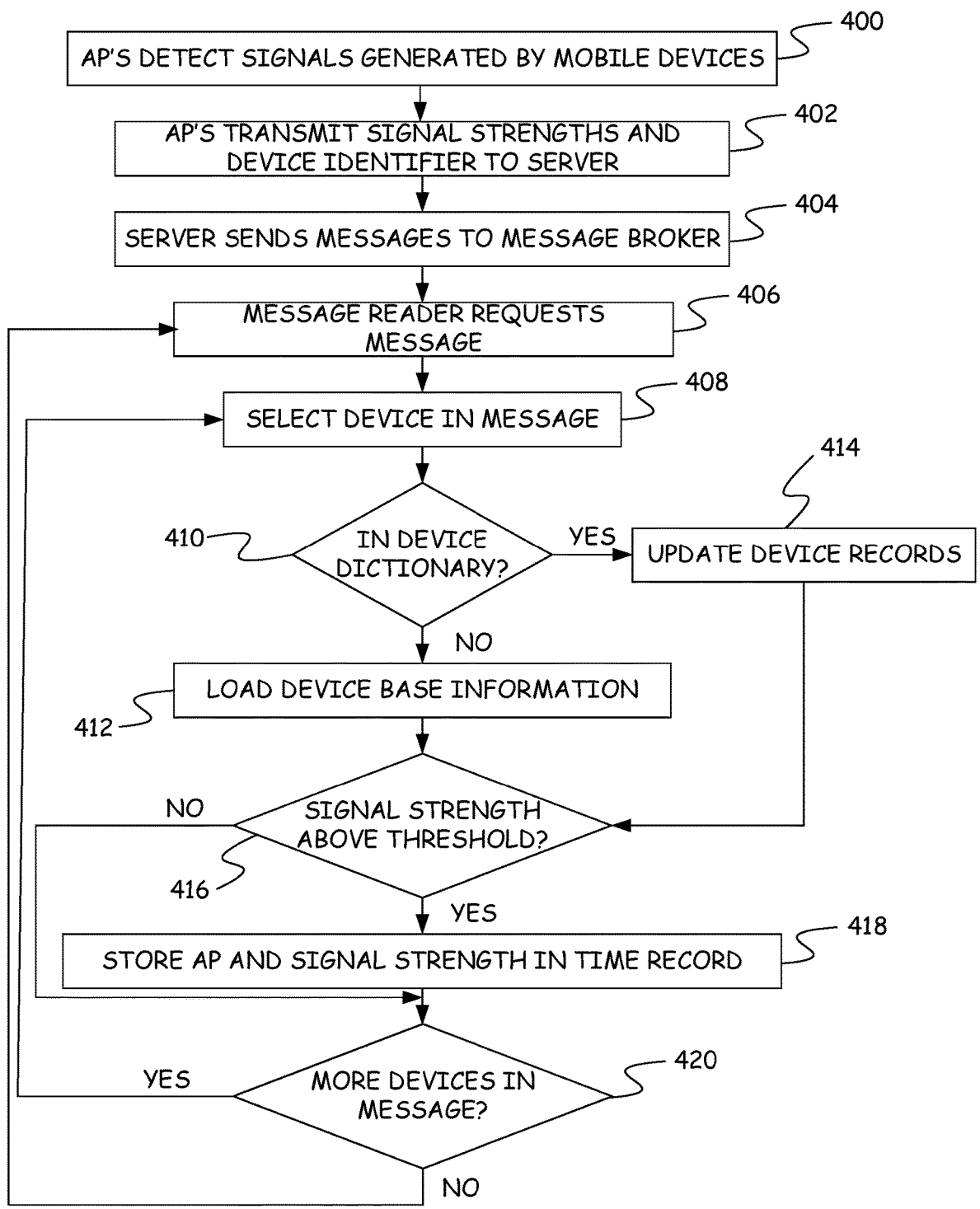
FIG. 4 is a flow diagram for gathering device signal strengths.
Figure 5:
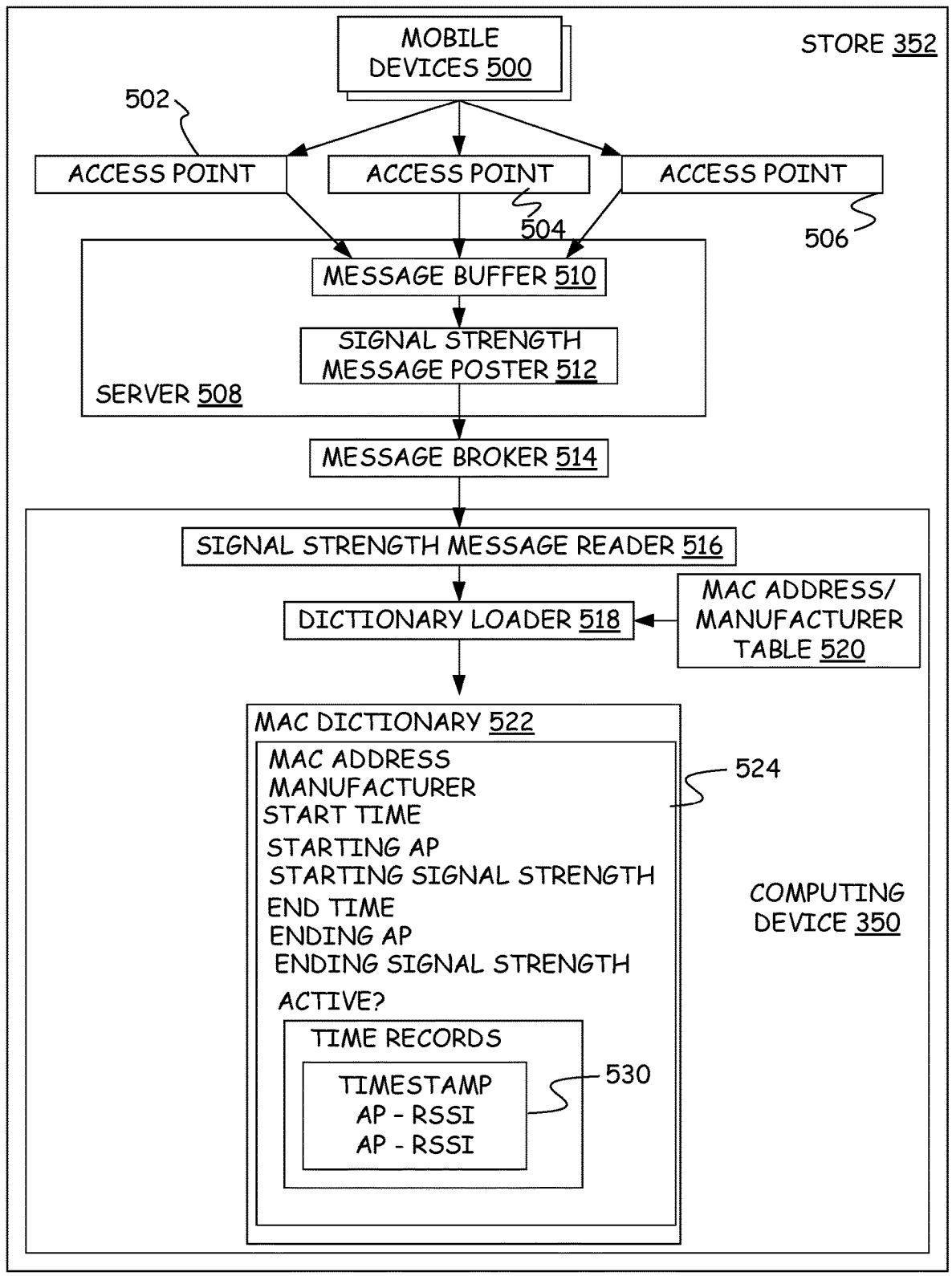
FIG. 5 is a block diagram of elements used in the method of FIG. 4.

Returning to FIG. 1, after gathering RFID location and exit information in random access memory, the process of FIG. 1 continues at step 102 where device signal strength data is gathered. FIG. 4 provides a flow diagram of a method of gathering device signal strength data in step 102 and FIG. 5 provides a block diagram of elements used to perform step 102.

In step 400 of FIG. 4, access points, such as access points 502, 504 and 506 in store 352 detect signals generated by mobile devices 500. The signals generated by mobile devices 500 include a media access control (MAC) address that uniquely identifies each mobile device. In accordance with one embodiment, the access points are distributed around store 352. Since the MAC addresses uniquely identify each device, the devices may be referred to by their MAC addresses. In particular, correlating a MAC address with an RFID tag is equivalent to correlating the device that is assigned that MAC address with the RFID tag and is further equivalent to correlating the device with the product unit that is connected to the RFID tag.

At step 402, each access point posts a message for a current measuring period that includes a list of all of the MAC addresses that the access point detected signals from as well as the strength of those received signals. In some embodiments, the strength is the Received Signal Strength Indication (RSSI). In accordance with one embodiment, the measuring period is a second such that each access point posts a list of MAC addresses every second. Each message further includes an identifier for the access point sending the message. The messages are posted to a server 508, which upon receiving each post request, stores the information in the message in a message buffer 510. A signal strength message poster 512 accesses message buffer 510 to retrieve the information provided by an access point and at step 404, the signal strength message poster 512 posts a message to a message broker 514 that includes the list of MAC addresses and their associated signal strengths as well as the identifier for the access point. In accordance with one embodiment, message broker 514 stores the received messages by associating the received messages with an access point signal strength topic. This association allows a message reader to request messages that have been stored for this topic. Message broker 514 can be executed within server 508 or may be executed on a separate server.

At step 406, a signal strength message reader 516 requests a message from message broker 514 related to the access point signal strength topic. The received message is provided to a dictionary loader 518, which at step 408 selects one of the devices found in the message.

At step 410, the dictionary loader 518 searches a MAC dictionary 522 in random access memory to see if a record 524 has already been created in MAC dictionary 522 for the MAC address of the device. If a record has not been created for the MAC address, base information for the device is stored in the MAC dictionary 522 to create a new record 524 for the device at step 412. This base information includes the MAC address, a manufacturer retrieved from a MAC address/manufacturer table 520, a start time, which is set to the time stamp of the current message, a starting access point, which is set to the access point of the current message, a starting signal strength, which is set to the signal strength in the current message as well as an ending access point and an ending signal strength, which are also set to the same values as the corresponding starting access point and starting signal strength. The start time provides the first time the device was detected and the starting access point and starting strength provide the access point that detected the strongest signal and the strength of that signal at the start time. The end time provides the last time the device was detected and the ending access point and ending strength provide the access point that detected the strongest signal and the strength of that signal at the end time. In addition, an active designation is set to true.

MAC address/manufacturer table 520 provides the names of manufacturers associated with certain groups of MAC addresses. In particular, certain segments of the MAC address are used to designate the manufacturer associated with the device. In step 412, the relevant segment of the MAC address is used to search table 520 to retrieve the manufacturer designated for the MAC address.

If the device is already in the dictionary at step 410, the device records are updated at step 414. In particular, if the active parameter has been marked as false, it is changed to true. In addition, if the staring time in the device's record 524 matches the time stamp of the current message, the starting signal strength is compared to the signal strength in the current message. If the signal strength of the current message is greater than the starting signal strength, the current access point identifier is stored in place of the corresponding starting access point in device record 524 and the signal strength of the current message is stored as the starting signal strength in device record 524. Similarly, if the end time in the device's record 524 matches the time stamp of the current message, the ending signal strength is compared to the signal strength in the current message. If the signal strength of the current message is greater than the ending signal strength, the current access point identifier is stored in place of the corresponding ending access point in device record 524 and the signal strength of the current message is stored as the ending signal strength in device record 524. If the time stamp of the current message is after the stored end time for record 524, the time stamp of the current message is stored as the end time, the access point of the current message is stored as the ending access point and the signal strength of the current message is stored as the ending signal strength.

After step 412 or 414, dictionary loader 518 determines if the signal strength of the current message is above a threshold at step 416. If the signal strength is above the threshold, the identifier for the access point and, optionally, the signal strength are stored in a time record 530 for the measuring period of the current message at step 418. Each time record 530 eventually provides a list of all access points that received a signal from the device that was above the threshold strength. In accordance with one embodiment, the list includes the access point identifier for the access point and the corresponding signal strength that the access point detected. If the signal strength is not above the threshold at step 416, the access point and its associated signal strengths are not stored in time record 530 at step 418. By not storing access point identifiers signal strengths that are below the threshold, the embodiments reduce the amount of memory that is consumed by MAC dictionary 522.

If the signal strength is not above the threshold at step 416 or after storing an access point identifier for a signal strength that is above the threshold at step 418, dictionary loader 518 determines if there are more devices listed in the current message at step 420. If there are more devices listed in the current message, the process returns to step 408 to select the next device in the message and steps 410-418 are repeated for the next device. When there are no more devices in the current message at step 420, the process returns to step 406 where message reader 516 requests a next message from message broker 514. Steps 408-420 are then repeated for the next message.

After gathering the device signal strengths at step 102 of FIG. 1, the access point identifiers are converted into device locations while freeing memory holding the access point identifiers and device signal strengths at step 104.

In the past, attempts have been made to determine the position of mobile devices based on the strength of the network signals received at each access point. These techniques assume that each signal strength is associated with a single respective distance between the access point and the mobile device. These expected distances are then used in trilateration to identify a position that is the respective expected distance from each access point that received a network signal from the mobile device.

The present inventors have discovered that such location determinations are often erroneous because each signal strength is associated with a range of distances between the mobile device and the access point instead of being associated with a single distance. As a result, attempting to calculate a location while assuming that each signal strength is associated with a single distance between the access point and the mobile device produces inaccurate locations for the mobile device. When there are a large number of devices in store 352, using the signal strengths to compute the location of each device requires a large amount of processing time. Since the resulting locations are inaccurate, these computations are wasteful. To avoid such inefficient operation of the computing device, the present inventors have counterintuitively used less data to calculate the positions of the mobile devices.

Figure 6:
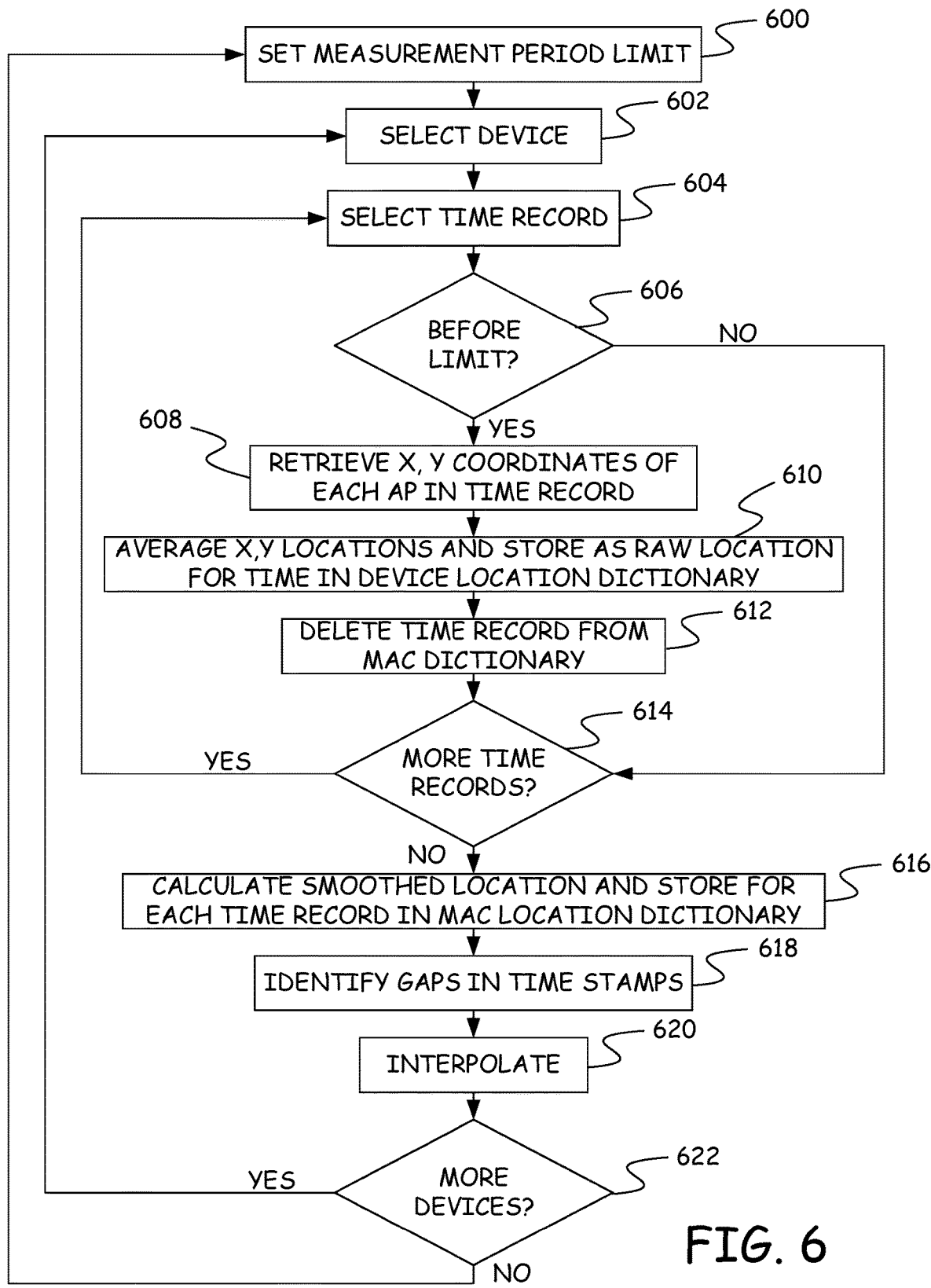
FIG. 6 is a flow diagram of a method for converting access point identifiers to device locations while freeing memory.
Figure 7:
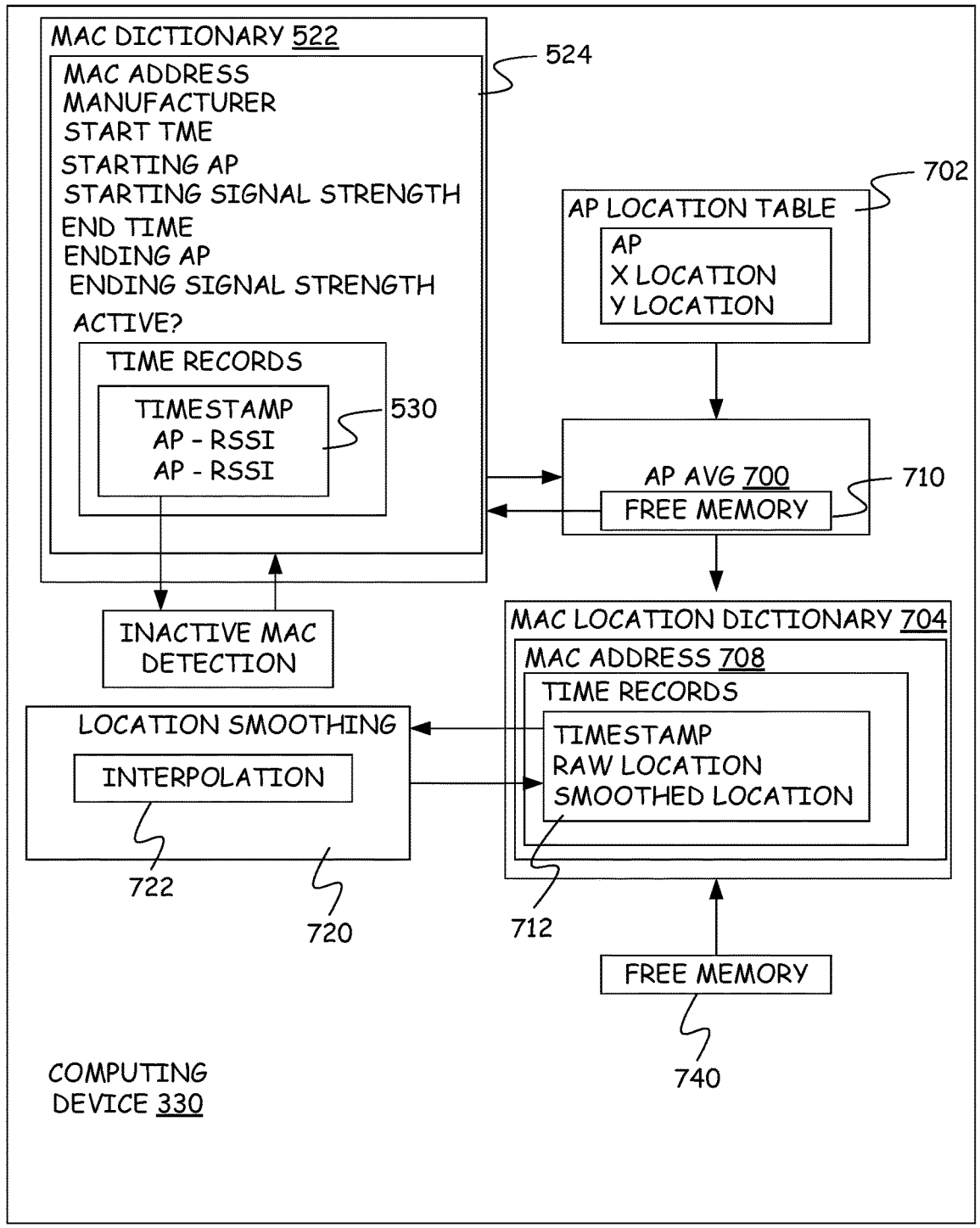
FIG. 7 is a block diagram of elements used in the method of FIG. 6.

FIG. 6 provides a flow diagram of a method for performing step 104 and FIG. 7 provides a block diagram of elements used in the method of FIG. 6.

In step 600 of FIG. 6, a measurement period limit is set so as to ensure that all data for any measurement period processed in the method of FIG. 6 has made it from the access point to the MAC dictionary 522. In accordance with one embodiment, the measurement period limit is selected to be two seconds before the current time such that no time record less than two seconds before the current time will be processed. At step 602, a device is selected from MAC dictionary 522 and at step 604, a time record 530 is selected from the device record 524 for the selected device.

At step 606, the time stamp of the selected time record is compared to the measurement period limit to determine if the time record has a timestamp that is before the time period limit. If the time record has a time stamp before or at the measurement period limit at step 606, the x,y coordinates of each access point in the time record are retrieved at step 608. In particular, an access point averaging app 700 of FIG. 7 uses the access point identifiers in time record 530 and retrieves the x,y coordinates of each access point from an access point location table 702.

At step 610, AP averaging app 700 averages the x-coordinates and y-coordinates of each access point in time record 530 to produce an average location for the time period associated with the time record. AP averaging app 700 then stores this average location in a MAC location dictionary 704 as a raw location together with the time stamp of the time record selected in step 604. In particular, the time stamp and the raw location are stored in a time record 712 of a MAC address record 708 within MAC location dictionary 704.

At step 612, a free memory routine 710 deletes the time record selected in step 604 from MAC dictionary 522. By deleting the time record, the embodiments limit the amount of memory consumed by MAC dictionary 522 to avoid having MAC dictionary 522 exceed the available memory of computing device 350. In accordance with one embodiment, the time record is deleted from random access memory before a location is determined for another device.

At step 614, AP averaging app 700 determines if there are more time records 530 in the MAC address record 524 selected at step 602. If there are more time records, the next time record is selected by returning to step 604 and steps 606-614 are repeated. If a time record is read at step 604 that is later than the measurement period limit set in step 600, steps 608, 610 and 612 are not performed for the time record and AP averaging app 700 simply selects another time record.

When all the time records currently stored for the selected device in MAC dictionary 522 that are before the measurement period limit have been processed at step 614, a location smoothing application 720 calculates smoothed locations for each time record 712 stored in MAC location dictionary 704 for the currently selected device at step 616. In accordance with one embodiment, the smoothed location for a time record is calculated as the average of the raw locations of all time records 712 that have a time stamp within a timespan of the time stamp of the record that the smoothed location is being calculated for. In accordance with one embodiment, the timespan is 30 seconds. In some circumstances, no time records will have been stored before the current time record or there will be gaps where time records were not stored for particular measurement periods. In such cases, the average is computed from the time records that are available in MAC location dictionary 704 for the timespan before the time stamp of the current record.

After the smoothed location has been determined for each time record in MAC location dictionary 704 for the currently selected device, gaps in the time stamps of time records 712 are identified at step 618 by examining the time stamps of each time record 712 stored for the current device. For any gaps where one or more measurement periods do not have a time record, interpolation routine 722 interpolates smoothed locations for the missing measurement period at step 620. In accordance with one embodiment, the interpolation is performed by assuming a linear progression between the smoothed locations stored on each side of the gaps in the time records. After step 620, a smoothed location has been determined for each measurement period and has been stored for the device selected at step 602 in MAC location dictionary 704.

At step 622, AP averaging app 700 determines if there are more devices in MAC dictionary 522. When there are more devices, another device is selected by returning to step 602 and steps 604-620 are repeated. When all of the devices in MAC dictionary 522 have been processed at step 622, the method returns to step 600 to set a new measurement period limit.

In order to further limit memory usage, on a periodic basis, a free memory application 740 deletes all raw location data from MAC location dictionary 704 that is older than required to process the smoothed locations. In addition, any MAC address record 708 that has not had a new time record 712 added to the MAC location dictionary 704 in a threshold period of time is marked as inactive by changing the active parameter in device record 524 of MAC dictionary 522 to false.

Figure 8:
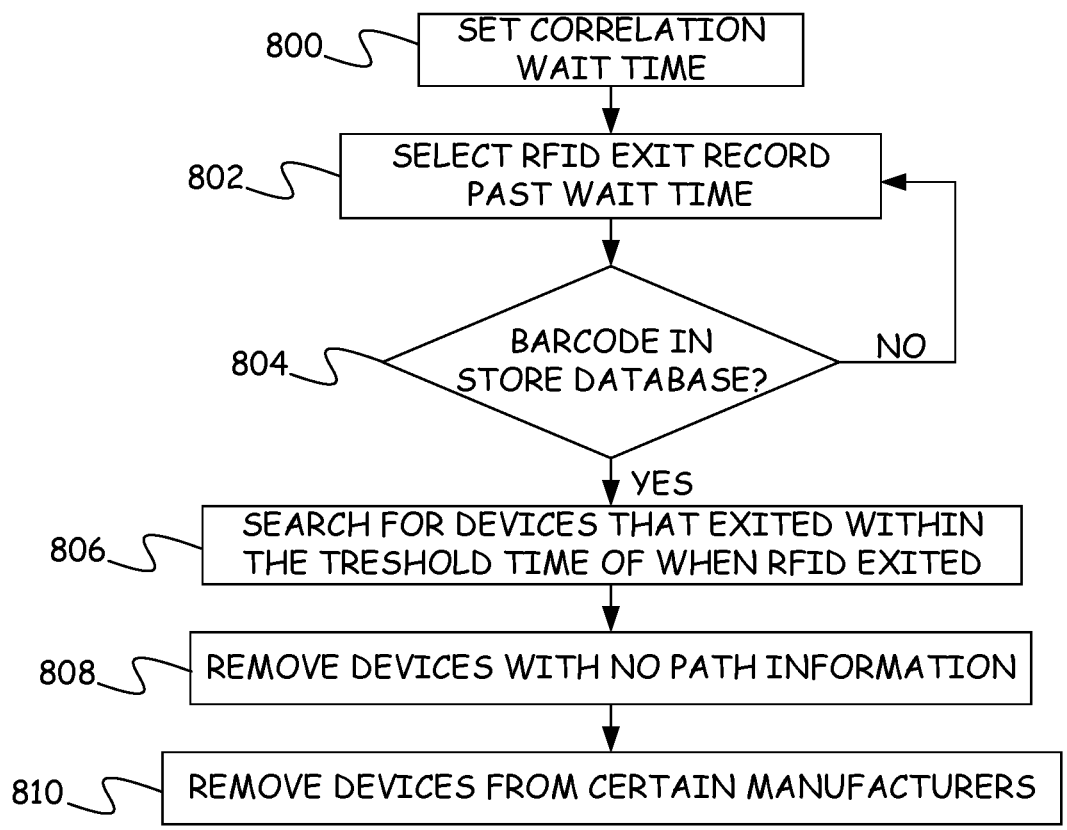
FIG. 8 is a flow diagram of a method of identifying candidate devices for a RFID tag that exited a building.
Figure 9:
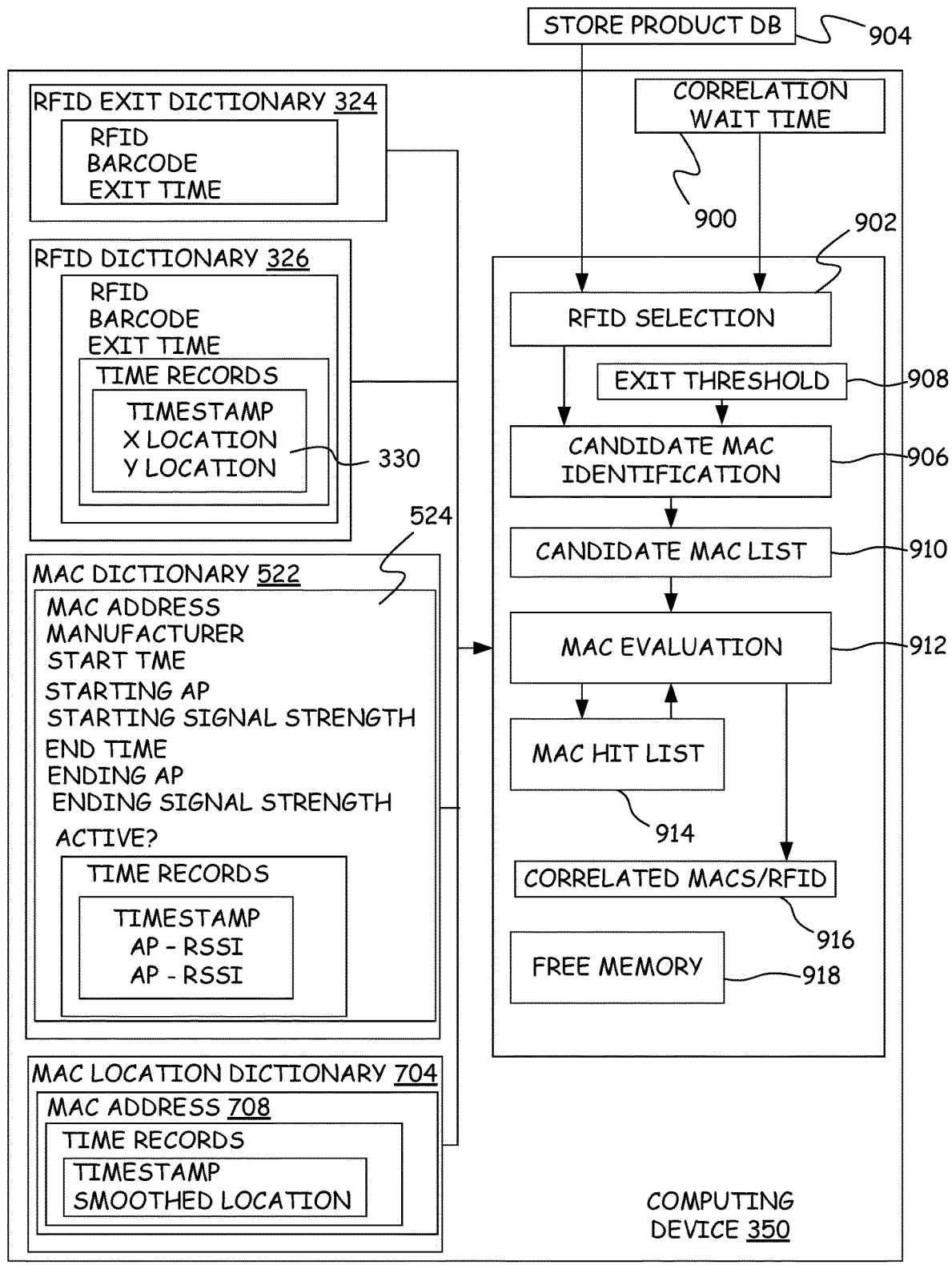
FIG. 9 is a block diagram of elements used in the methods of FIGS. 8 and 10.

After the device locations have been determined at step 104 of FIG. 1, candidate devices are identified for each RFID tag that exited the store at step 106. FIG. 8 provides a flow diagram for identifying candidate devices in accordance with one embodiment and FIG. 9 provides a block diagram of elements used in the method of FIG. 8.

At step 800 of FIG. 8, a correlation wait time 900 is set which delays when a correlation should be determined for an RFID tag. In particular, correlation wait time 900 is set to ensure that the RFID tag did indeed exit the store and did not reenter the store and to ensure that any devices that may be associated with the RFID tag have also exited the store.

At step 802, an RFID selection module 902 selects an RFID exit record from RFID exit dictionary 324 and determines if the exit time for the RFID is separated from the current time by correlation wait time 900. If the RFID record has an exit time that is not separated from the current time by at least correlation wait time 900, the next RFID record in RFID exit dictionary 324 is selected until an RFID exit record is found with an exit time that is earlier than the current time minus correlation wait time 900.

At step 804, RFID selection module 902 determines if the barcode stored in the RFID exit record selected at step 802 is found in a store product database 904, which contains barcodes for each product carried by the store. The check performed in step 804 is to ensure that the RFID tag is not on a product brought into the store from another store. If the barcode is not in store product database 904, the RFID exit record is removed from RFID exit dictionary 324 and a new RFID record is selected by returning to step 802.

When the barcode for the RFID exit record is found in the store product database 904 at step 804, a search for devices that exited within a threshold time of when the RFID exited is performed at step 806 by a candidate MAC identification module 906. The exit threshold time 908 used by candidate MAC identification module 906 is a time period that spans before and after the RFID exit time in the RFID exit record of RFID exit dictionary 324. Thus, candidate MAC identification module 906 examines the ending time of each MAC record 524 in MAC dictionary 522 to determine if the ending time is within the exit threshold 908 around the exit time of the RFID exit record.

For each MAC address identified in step 806, the candidate MAC identification module 906 performs a search of MAC location dictionary 704 for a MAC address record 708 for the candidate device. If the device does not have a MAC address record 708 in MAC location dictionary 704, the signal strength from the device was not strong enough to establish a location for the device in the store. As a result, the device is removed from further consideration at step 808. In addition, devices from certain manufacturers are removed by comparing the manufacturer stored in the MAC address record 524 of MAC dictionary 522 to a list of manufacturers associated with devices used by store employees at step 810. This helps to reduce the number of candidate devices by removing devices that should not be correlated to an RFID tag that has exited the store. The remaining candidate devices are stored in a candidate MAC list 910.

Figure 10:
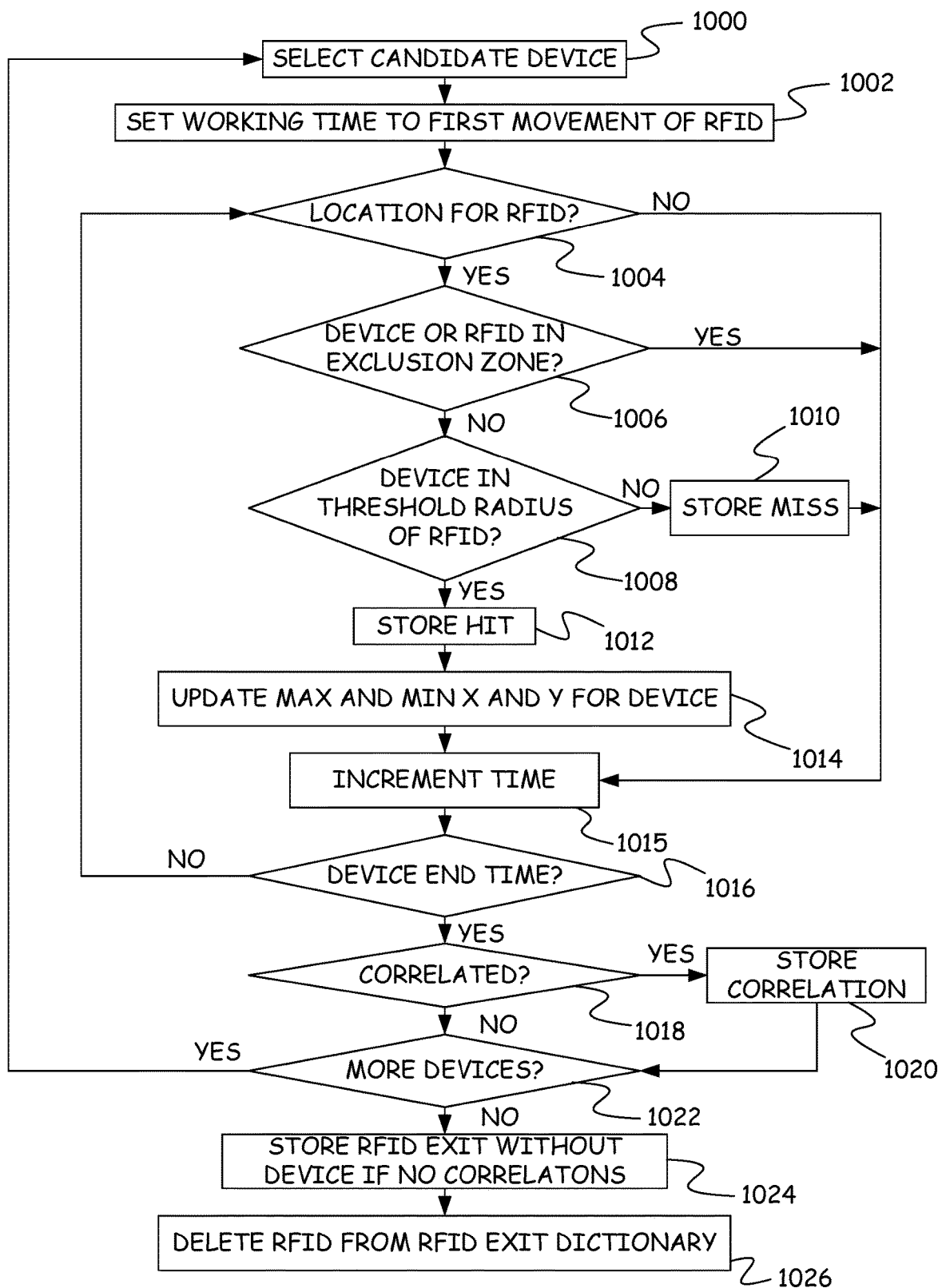
FIG. 10 is a flow diagram of a method of correlating exited RFIDs to candidate devices.

After the candidate devices have been identified at step 106 of FIG. 1, a MAC evaluation module 912 attempts to correlate the exited RFID tag to one or more of the devices in the candidate MAC list 910 at step 108. FIG. 10 provides a flow diagram of a method of correlating candidate devices to an RFID tag that exited.

At step 1000, a candidate device is selected by MAC evaluation module 912 from candidate MAC list 910. At step 1002, a working time is set to the time of first movement of the RFID tag. The working time is a time variable representing a time point that is currently being processed to determine if a device is correlated to the RFID tag.

The time of first movement of the RFID tag is determined by working backwards from the exit time of the RFID tag to find a sufficiently large gap between time stamps in the time records of RFID dictionary 326. For example, a gap of 10 minutes. Working forward from the time stamp at the end of this gap, movement between each time record is determined as well as an average movement over a timespan, such as 10 minutes. When the average movement is less than a threshold, such as one inch, while the movement between the last two time stamps is greater than a second threshold, such as 12 inches, the latest time stamp is set as the beginning of the movement of the RFID tag.

At step 1004, RFID dictionary 326 is examined to determine if there is a time record 330 for the current value of the working time. If there is a time record, the location of the RFID stored for time record 330 and the location of the candidate MAC device found in MAC address record 708 for the working time are compared to a collection of exclusion zones at step 1006. If either the RFID tag or the device were in an exclusion zone at the current working time, no further processing is performed for this measurement period. Such exclusion zones include areas near the checkout and exit, which are excluded because nearly all devices and nearly all RFID tags eventually pass through the checkout area and exit making the information provided at the checkout areas and exits less useful for correlating RFID tags to MAC devices. By removing such location information from the correlation determination, the present invention improves the operation of the computer by improving the resulting correlation.

If neither the device nor the RFID tag was in an exclusion zone at the current working time, MAC evaluation module 912 determines if the candidate device was within a threshold radius of the RFID location at the current working time at step 1008. In accordance with one embodiment, the threshold radius is 65 feet. If the device was not within the threshold radius of the RFID tag for the current working time, a "miss" is stored in a MAC hit list 914 for the current device at step 1010. If the device was within the threshold radius of the RFID tag during the current working time, a "hit" is stored in the MAC hit list 914 for the current device at step 1012.

When a "hit" is stored for a device at step 1012, a maximum x and maximum y and a minimum x and minimum y for the device are updated at step 1014. The maximums and minimums of the x,y coordinates of the device define a rectangle that encompasses all of the correlated locations traversed by the device between when the RFID tag began to move and when the device finally exited the store. If the smoothed location of the device in MAC address record 708 for the current working time has an x or y coordinate that is less than the currently stored minimum x or minimum y for the device, the coordinate that is lower than the currently stored minimum is set as the new minimum for that coordinate. Similarly, if one or both of the x,y coordinates for the device for the current working time is greater than the stored maximum x or maximum y coordinate, the coordinate that is larger than the current stored maximum is stored as the new maximum for that coordinate.

If there is no location in the time records 330 for the RFID tag at step 1004, or if one or more of the device or RFID tag are in an exclusion zone at step 1006 or after storing a miss for the device at step 1010 or after updating the max/min x,y coordinates for a device with a "hit", the time is incremented at step 1015. In particular, the current working time is incremented by one measurement period of the RFID location data.

At step 1016, MAC evaluation 912 determines if the device end time of MAC address record 524 has been reached. If the device end time has not been reached, steps 1004-1015 are repeated for the new current working time.

When the device end time is reached at step 1016, MAC evaluation module 912 determines if the current device is correlated to the RFID tag at step 1018. In accordance with one embodiment, the device is determined to be correlated to the RFID tag if the ratio of the number of "hits" to the sum of the number of "hits" and number of "misses" is greater than some thresholds; the rectangle represented by the maximum x, maximum y, minimum x and minimum y of the correlated locations of the device between when the RFID tag began to move and the device end time is larger than some minimum square area; and there are a sufficient number of hits stored in MAC hit list 914. In accordance with one embodiment, the threshold ratio is 0.60, the minimum square area is 100,000 square inches and the minimum number of hits is 90. If the device meets all of the correlation requirements, the device and the RFID are stored as a correlated MAC/RFID 916 at step 1020. If the device is not considered to be correlated to the RFID tag at step 1018 or after the correlation has been stored at step 1020, the process continues at step 1022 where the candidate MAC list 910 is examined to determine if there are more candidate devices. If there are more candidate devices, the process returns to step 1000 to select the next device in candidate MAC list 910 and steps 1002-1020 are repeated.

When all the devices in candidate MAC list 910 have been evaluated to determine if they are correlated to the RFID tag, MAC evaluation module 912 determines if any devices have been stored in correlated MAC/RFID tags 916 at step 1024. If no devices were found to be correlated to the RFID tag, MAC evaluation module 912 stores the RFID exit without a device for later processing discussed below to determine if the RFID tag left the store without being processed by the POS system.

Figure 12:
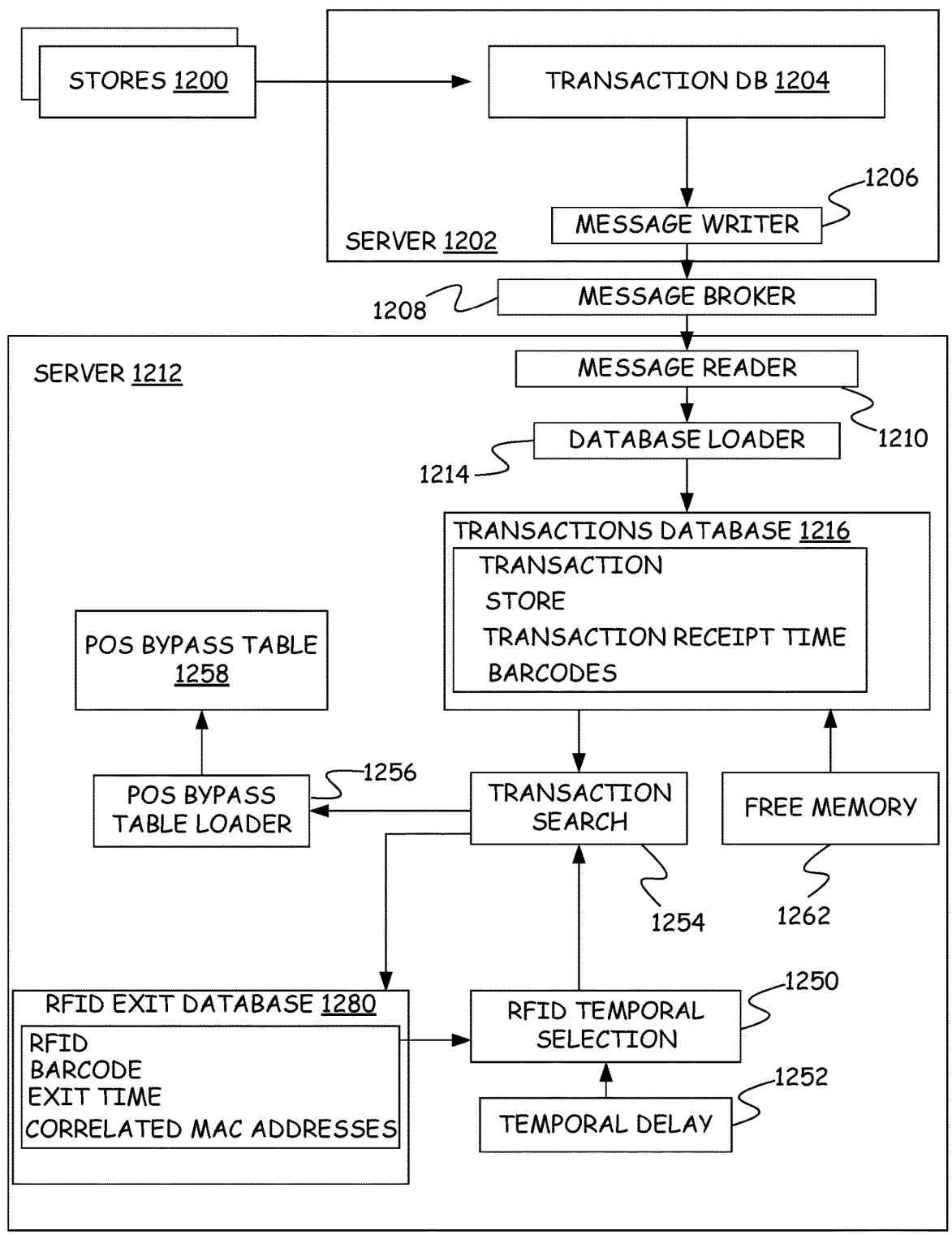
FIG. 12 is a block diagram of elements used in the method of FIG. 11.

After the RFID tag has been processed to identify devices that are correlated with the RFID tag, the information for the RFID in RFID exit dictionary 324 is transferred to an RFID exit database 1280 on a server 1212 shown in FIG. 12. The information for the RFID can then be removed from RFID exit dictionary 324 by a free memory module 918 at step 1026. The correlated MAC/RFID 916, if the RFID tag was correlated, is also forwarded to server 1212 for storage in RFID exit database 1280 so that it can be used in further processing as described below..

After candidate devices have been correlated to RFIDs that exited the store, transaction data from the stores is collected and filtered at step 110 of FIG. 1. In accordance with one embodiment, as shown in the block diagram of FIG. 12, stores 1200 deliver transaction data to a transaction server 1202 that hosts a transaction database 1204. Transaction server 1202 stores the data in transaction database 1204 and then a message writer 1206 in transaction server 1202 reads the data in transaction database 1204 and generates a separate message for each transaction, which is sent to a message broker 1208. Message broker 1208 may be implemented within server 1202 or may be implemented within a separate server. In accordance with one embodiment, each transaction message is written to a transaction topic.

A message reader 1210 on a server 1212 requests messages from message broker 1208 on the transaction topic and provides the received messages to a database loader 1214. In accordance with one embodiment, message reader 1210 filters the messages so that only transaction data related to stores in which candidate devices are being correlated with RFID tags are provided to database loader 1214. For each message it receives, database loader 1214 creates a record in transaction database 1216 that includes a transaction identifier, a store, a transaction receipt time, a load time for loading the transaction data into transactions database 1216 and barcodes of products associated with the transaction. In accordance with some embodiments, additional information may be stored for each transaction including an originating channel of the purchase (instore POS or online), the fulfillment channel (instore POS or instore pickup), the identity of the register where the receipt was generated and for each item involved in the transaction, the price of the item and an instore identifier for the item.

Although step 110 is shown as occurring at a discrete time after step 108, in fact, step 110 is continuously being performed.

Figure 11:
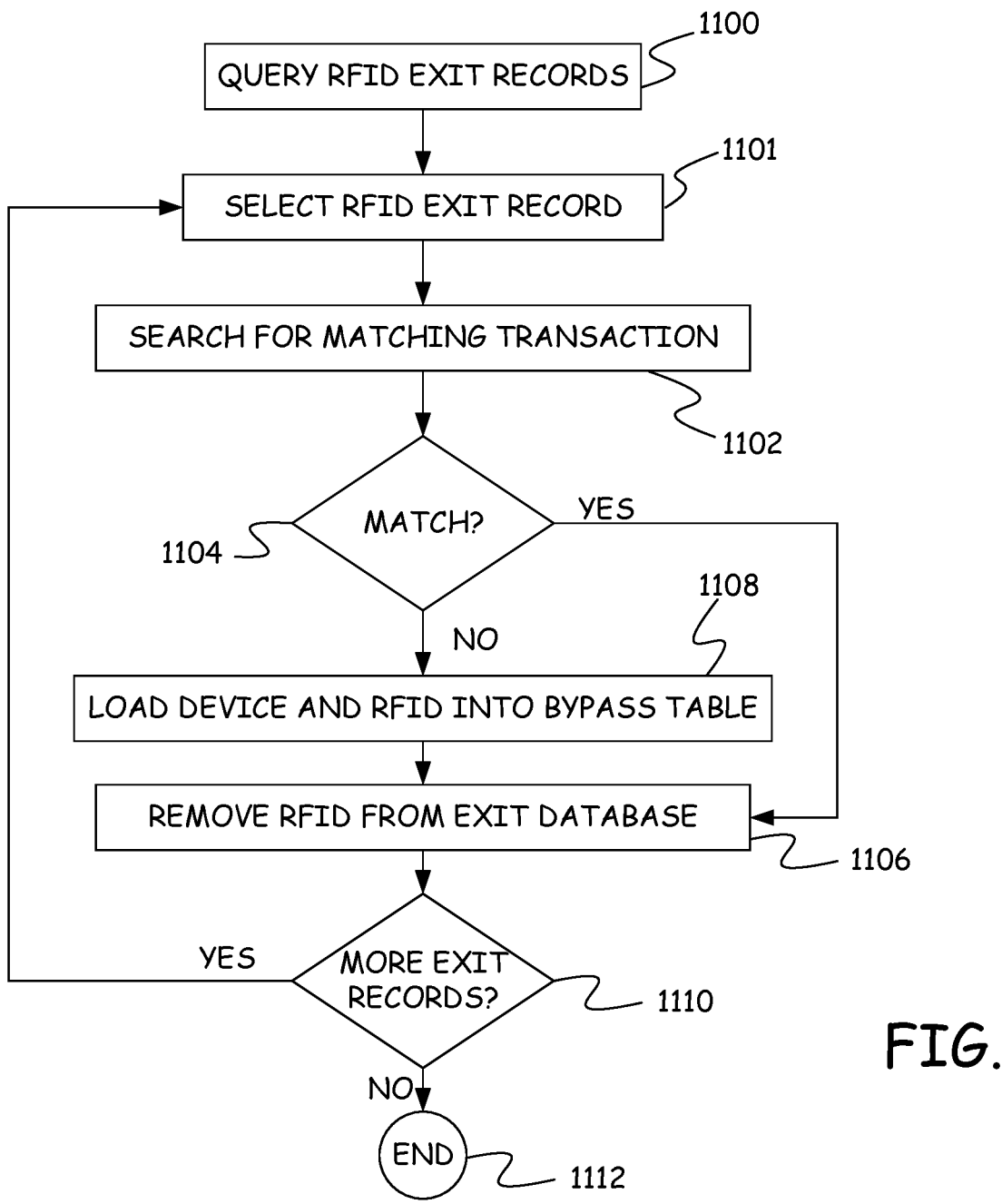
FIG. 11 is a flow diagram of a method for detecting POS bypass.

At step 112 of FIG. 1, POS bypasses are identified in which an item having an RFID tag exited the store without being processed at a POS register. FIG. 11 provides a flow diagram of a method in accordance with one embodiment for performing step 112.

In step 1100 of FIG. 11, an RFID temporal selection module 1250 performs a query on RFID exit database 1280 to obtain all RFID exit records that have an exit time that precedes the current time by a temporal delay amount 1252. Temporal delay amount 1252 can be a fixed amount of time, such as for example 1 hour and 45 minutes, or can be determined by running a query against transactions database 1216 to identify the greatest delay between the transaction receipt time and when the transaction record was stored in transactions database 1216.

At step 1101, RFID temporal selection module 1250 selects one of the RFID exit records returned by the query and provides the RFID, barcode, exit time and any correlated MAC addresses to transaction search module 1254, which performs a search for a matching transaction at step 1102. The search for the matching transaction includes searching for a transaction for the same store and for the same barcode where the RFID exit time is after the transaction receipt time and is within a threshold time of the transaction receipt time. In accordance with one embodiment, the threshold time is 20 minutes.

If a match for the RFID exit record is found in transaction database 1216 at step 1104, the product associated with the RFID tag is considered to have been processed at the POS and no bypass occurred. As a result, at step 1106, the RFID exit record is removed from RFID exit database 1280 at step 1106. The process then determines if there are more RFID exit records in the query results at step 1110. If there are more records, the process returns to step 1101 to select the next RFID exit record.

When there is no matching transaction for an RFID exit record at step 1104, transaction search module 1254 provides the RFID and correlated MAC addresses, if any, to POS bypass table loader 1256 POS bypass table loader 1256 stores the correlated MAC addresses and the RFID in a POS bypass table 1258 at step 1108. After loading the MAC address and the RFID into bypass table 1258 at step 1108, transaction search 1254 removes the RFID from RFID exit database 1280 at step 1106. Temporal selection module 1250 then determines if there are more RFID exit records in the query results at step 1110. If there are more records, the process returns to step 1101 to select the next RFID exit record. When all of the RFID exit records in the query results have been processed at step 1110, the process of FIG. 11 ends at step 1112 and waits to be re-executed at periodic intervals.

On a periodic basis, a free memory routine 1262 clears transaction records from transaction database 1216 that have been held in transaction database 1216 for more than a designated holding period, such as 24 hours. In addition, records with transaction receipt times that are before the exit time of a non-processed RFID exit record by more than a threshold amount are also deleted from transactions database 1216.

POS bypass table 1258 can be used in a number of different ways. In accordance with one embodiment, a module in each store compares the correlated MAC addresses in POS bypass table 1258 to the MAC addresses currently in the store as indicated by MAC dictionary 522. When a matching MAC address is detected, an alert can be sent to personnel within the store and a database can be updated indicating the time, date and store when the MAC address was once again detected. In other embodiments, when a matching MAC address has been detected in a store, the location of the MAC address can be retrieved from MAC location dictionary 704 and can be used to activate cameras within the store to capture an image of the person carrying the device. In still further embodiments, POS bypass table 1258 can be accessed to develop a profile for a MAC address indicating what products have bypassed the POS register with the MAC address, the stores where the bypass occurred and the times and dates when the bypasses occurred.

Figure 13:
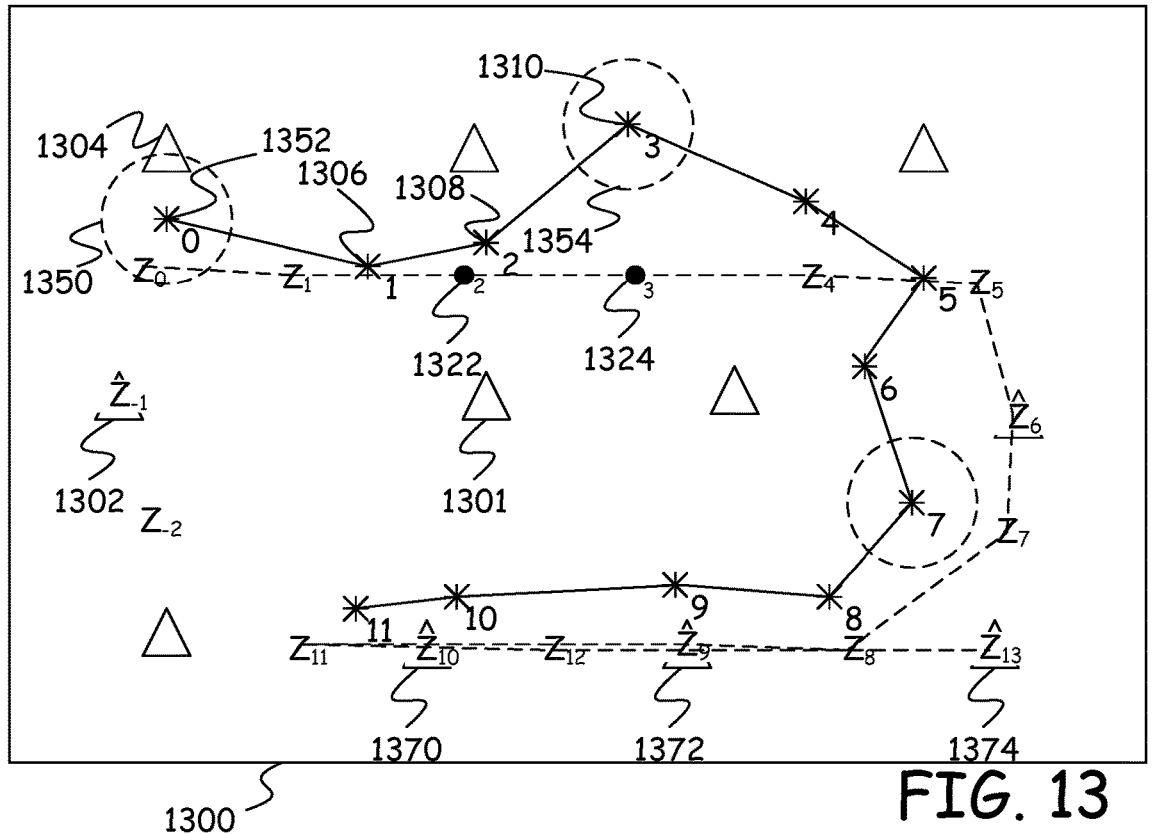
FIG. 13 is a user interface showing paths of an RFID tag and a first mobile device relative to access points in a store.
Figure 14:
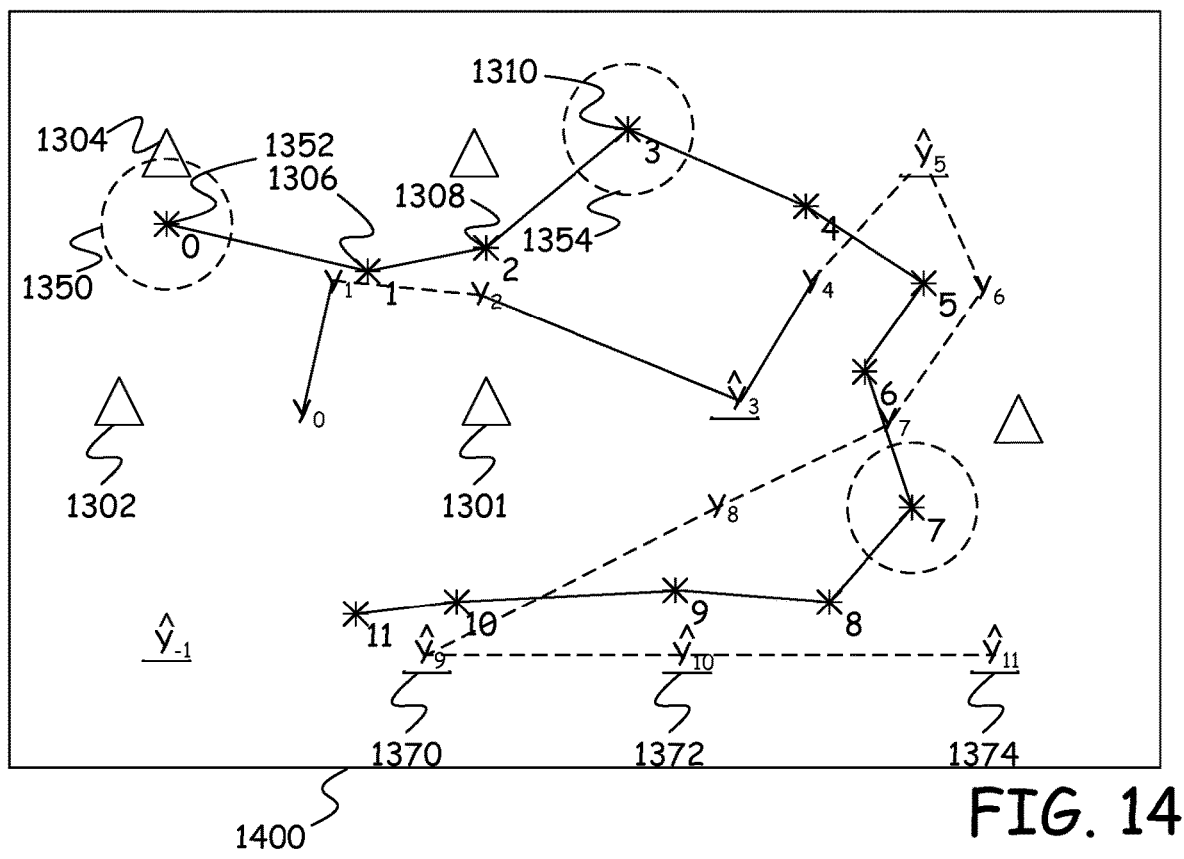
FIG. 14 is a user interface showing the path of the RFID tag of FIG. 13 and a path of a second mobile device relative to the access points in the store of FIG. 13.

FIGS. 13 and 14 provide user interfaces 1300 and 1400 showing the paths of two respective mobile devices relative to a same path of an RFID tag as determined using the processes described above. In FIGS. 13 and 14, subscripts indicate a measurement period, with 0 indicating when the RFID tag started moving and negative values indicating measurement periods before the RFID tag started moving. The triangles shown in FIGS. 13 and 14 designate the location of access points such as access points 1301, 1302 and 1304. The star symbols, such as star symbols 1306, 1308 and 1310 mark locations of the RFID tag. In FIG. 13, each Z represents a location of a first mobile device as determined from signals received by at least one access point and the filled circles 1322 and 1324 represent locations determined through interpolation. In FIG. 14, each Y represents the location of a second mobile device.

As shown in FIG. 13, the first mobile device was located within the threshold distance (indicated by a circle 1350) from where the RFID tag started moving at location 1352 and measurement period 0. At measurement period 3, however, the determined location 1324 for the mobile device was beyond the threshold distance as indicated by circle 1354 around star 1310. The second mobile device of FIG. 14, on the other hand, was further than the threshold distance away from the RFID tag at both measurement period 0 and measurement period 3 as indicated by circles 1350 and 1354. It can be seen by comparing FIGS. 13 and 14 that the mobile device of FIG. 13 is within the threshold distance of the RFID tag more often than the mobile device of FIG. 14 and therefore would be marked as the most likely candidate device to have been moving with the RFID tag.

As shown in FIGS. 13 and 14, both of the mobile devices appear to have left the store long after the RFID tag left the store. This effect is caused by the access points 1370, 1372 and 1374 detecting the mobile devices as the mobile device moved in front of the store.

Figure 15:
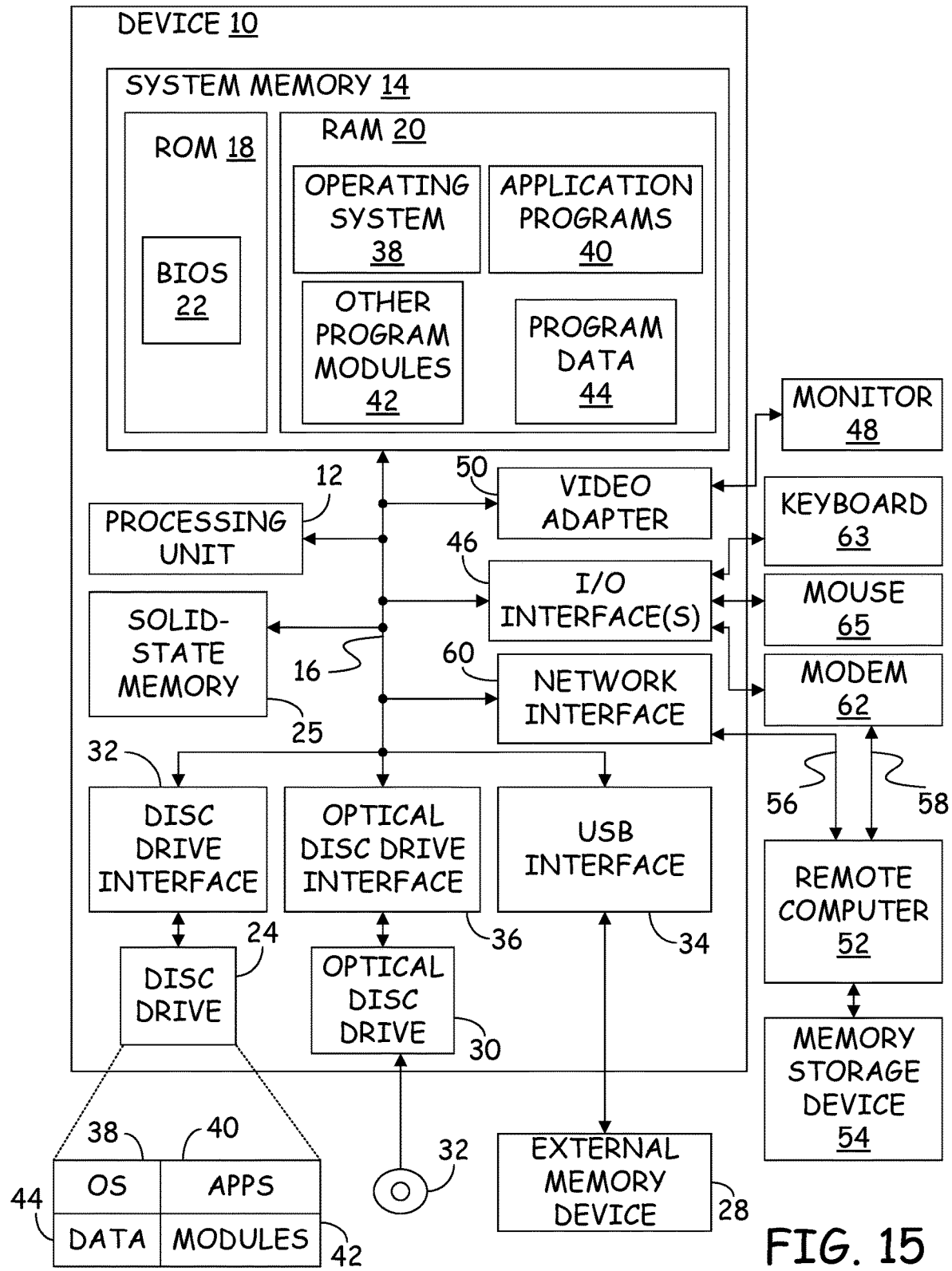
FIG. 15 provides a block diagram of a computing device used in the various embodiments.

FIG. 15 provides an example of a computing device 10 that can be used as any of the servers or computing devices discussed above. Computing device 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 15. The network connections depicted in FIG. 15 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 15 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
   for a measurement period, receiving signal strengths, device identifiers and access point identifiers from a plurality of access points;
   storing a record for the measurement period in random access memory, the record being associated with a single device identifier and containing access point identifiers associated with signal strengths received for the measurement period;
   determining the location of a device for the measurement period through steps comprising:
      for each of a plurality access point identifiers in the record for the measurement period, retrieving spatial coordinates of a corresponding access point; and
      setting the location of the device for the measurement period to the average of the retrieved spatial coordinates, wherein the location of the device is set without using the signal strengths except for determining that the signal strengths are above a threshold strength.

2. The computer-implemented method of claim 1 wherein storing a record for the measurement period comprises:
   determining that a received signal strength is below the threshold strength; and
   in response, not storing the access point identifier that corresponds to the received signal strength in the record.

3. The computer-implemented method of claim 1 further comprising performing the steps of receiving signal strengths, device identifiers and access point identifiers, storing a record for the measurement period, and determining the location of the device for each of a plurality of successive measurement periods.

4. The computer-implemented method of claim 3 wherein storing a record for the measurement period comprises:
   determining that a received signal strength is below the threshold strength; and
   in response, not storing the access point identifier that corresponds to the received signal strength in the record.

5. The computer-implemented method of claim 4 further comprising when a received signal strength is below the threshold strength but is the strongest signal strength received for the device for the measurement period, storing the signal strength as a last received signal strength without using the signal strength to set the location of the device.

6. The computer-implemented method of claim 4 further comprising:
   for each measurement period for which a location was set, determining a smoothed location for the device using a location for the device set for at least one other measurement period.

7. The computer-implemented method of claim 6 further comprising:
   determining that a location for the device was not set for a measurement period; and
   interpolating a location for the device during the measurement period based on smoothed locations of the device for at least two other measurement periods.

8. The computer-implemented method of claim 6 further comprising:
   receiving location information for an RFID tag for each of a plurality of RFID measurement periods;
   determining a distance between the smoothed location of the device and the location of the RFID tag for each of the plurality of RFID measurement periods;
   comparing each distance to a threshold distance; and
   using the results of the comparisons to determine whether the RFID tag was moving with the device.

9. The computer-implemented method of claim 1 further comprising upon setting a location for the device for a measurement period, deleting at least the access point identifiers from the record for the measurement period from random access memory.

10. A computer comprising:
    a random access memory;
    a processor executing instructions retrieved from the random access memory to perform steps comprising:
       receiving signal strengths, device identifiers and access point identifiers from a plurality of access points;
       storing received access point identifiers in the random access memory; and
       setting a location for a device to an average of locations of access points corresponding to the access point identifiers, wherein the location of the device is set without using the signal strengths except for determining that the signal strengths are above a threshold.

11. The computer of claim 10 wherein storing received access point identifiers comprises:
    creating a record in the random access memory for a measurement period for a device identified by a received device identifier; and
    storing an access point identifier in the record for each signal strength received for the measurement period for the device where the signal strength exceeds the threshold strength such that access point identifiers for signal strengths below the threshold strength are not stored in the record.

12. The computer of claim 10 further comprising the processor performing the steps of receiving, and storing for each of a plurality of measurement periods.

13. The computer of claim 10 further comprising the processor storing the measurement period when a last signal strength for a device was received from any of the plurality of access points.

14. The computer of claim 13 further comprising the processor comparing a measurement period when an RFID tag left a building to the respective measurement periods when a last signal strength was received for a plurality of devices to identify a list of candidate devices that may have moved with the RFID tag within the building.

15. The computer of claim 14 further comprising the processor identifying which of the list of candidate devices moved with the RFID tag within the building by comparing locations of the RFID tag at each of a plurality of RFID measurement periods to locations of the candidate devices at those RFID measurement periods.

16. A method comprising:
receiving signal strengths for signals generated by a device, wherein each signal strength is from a separate access point;
identifying a plurality of access points that provided signal strengths above a threshold; and
setting a location for the device to an average of locations of the identified access points wherein the location of the device is set without using the signal strengths except for determining that the signal strengths are above the threshold.

17. The method of claim 16 further comprising after setting a location for each device, freeing a memory containing the signal strengths.

18. The method of claim 17 further comprising before freeing the memory, storing an indication that each device with a received signal strength was present in a building.

19. The method of claim 18 further comprising receiving signal strengths, identifying access points, setting locations for the device, and determining distances for each of a plurality of measurement periods.

20. The method of claim 19 further comprising determining that for a measurement period a location of the device was not determined and interpolating a location for the device from locations determined for the device for other measurement periods.

* * * * *